(12) United States Patent
Yamamura et al.

(10) Patent No.: US 9,876,370 B2
(45) Date of Patent: Jan. 23, 2018

(54) CHARGING STATION AND CHARGING STATION GUIDE FOR AUTONOMOUSLY NAVIGATING UTILITY VEHICLE

(71) Applicant: Honda Motor Co., Ltd., Tokyo (JP)

(72) Inventors: Makoto Yamamura, Wako (JP); Toshiaki Kawakami, Wako (JP); Jin Nishimura, Wako (JP); Yuki Matsui, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 15/080,250

(22) Filed: Mar. 24, 2016

(65) Prior Publication Data

US 2016/0285288 A1 Sep. 29, 2016

(30) Foreign Application Priority Data

Mar. 27, 2015 (JP) ................. 2015-067219

(51) Int. Cl.
*H02J 7/00* (2006.01)
*B60L 11/18* (2006.01)
*G05D 1/02* (2006.01)

(52) U.S. Cl.
CPC ......... *H02J 7/0027* (2013.01); *B60L 11/1816* (2013.01); *B60L 11/1833* (2013.01); *G05D 1/0225* (2013.01); *G05D 1/0265* (2013.01)

(58) Field of Classification Search
CPC . H02J 7/0027; B60L 11/1816; B60L 11/1833; G05D 1/0225; G05D 1/0265
USPC ..................................... 701/22, 26
See application file for complete search history.

(56) References Cited

U.S. PATENT DOCUMENTS

| 2004/0158357 | A1 | 8/2004 | Lee et al. | |
|---|---|---|---|---|
| 2005/0267629 | A1 | 12/2005 | Petersson et al. | |
| 2009/0266592 | A1* | 10/2009 | Koyama | H05K 3/361 174/259 |
| 2011/0222255 | A1* | 9/2011 | Kitano | H01L 23/49827 361/782 |
| 2011/0234153 | A1* | 9/2011 | Abramson | A01D 34/008 320/107 |
| 2012/0083963 | A1* | 4/2012 | Sato | G05D 1/0259 701/25 |
| 2013/0167502 | A1* | 7/2013 | Wilson | B29C 70/025 57/210 |

(Continued)

FOREIGN PATENT DOCUMENTS

| JP | 2005531832 A | 10/2005 |
|---|---|---|
| JP | 2012079023 A | 4/2012 |
| JP | 2013164741 A | 8/2013 |

*Primary Examiner* — Marthe Marc-Coleman
(74) *Attorney, Agent, or Firm* — Duft Bornsen & Fettig LLP (57) ABSTRACT

In a charging station for charging a battery installed on an autonomously navigating utility vehicle equipped with a prime mover powered by the battery to travel about a working area delineated by a boundary wire, there are provided with a pair of charging terminals installed on the station to be capable of connecting with a pair of charging terminals installed on the vehicle, a first wire installed on the station at a location inside of the working area and being formed as a circular shape having a center, and a second wire installed on the station to be formed as a shape that is symmetrical with respect to a center line obtained by connecting a midpoint of the terminals and the center of the first wire.

10 Claims, 10 Drawing Sheets

(56) References Cited

U.S. PATENT DOCUMENTS

| | | | |
|---|---|---|---|
| 2013/0200884 A1* | 8/2013 | Manabe | ............ G01B 7/14 324/207.16 |
| 2013/0211645 A1 | 8/2013 | Yamamura et al. | |
| 2013/0211647 A1 | 8/2013 | Yamamura et al. | |

* cited by examiner

United States Patent US 9,876,370 B2

CHARGING STATION AND CHARGING STATION GUIDE FOR AUTONOMOUSLY NAVIGATING UTILITY VEHICLE

CROSS-REFERENCE TO RELATED APPLICATION

This application is based upon and claims the benefit of priority from Japanese Patent Application No. 2015-067219 filed on Mar. 27, 2015, the contents of which are incorporated herein by reference.

BACKGROUND OF THE INVENTION

Field of the Invention

This invention relates to a charging station for charging an autonomously navigating utility vehicle and a guide for guiding the autonomously navigating utility vehicle to the charging station.

Description of Related Art

Techniques are known that control an autonomously navigating utility vehicle equipped with electric motors and a battery so as to perform a task while autonomously navigating or traveling in a working area delineated by a boundary wire, as taught by Japanese Laid-Open Patent Application No. 2013-164741, for example. When the battery requires charging, the technique described in this reference makes the utility vehicle return to a charging station installed above the boundary wire by driving it along the boundary wire on the basis of outputs of magnetic sensors.

However, the technique described in the reference requires the charging station to be installed above the boundary wire and in a direction parallel to the boundary wire, so that freedom of charging station arrangement is restricted.

SUMMARY OF THE INVENTION

According to a first aspect of the present invention, there is provided a charging station for charging a battery installed on an autonomously navigating utility vehicle equipped with a prime mover powered by the battery to travel about a working area delineated by a boundary wire in order to perform work autonomously, comprising: a pair of charging terminals installed on the station to be spaced apart each other via a midpoint, the pair of charging terminals being capable of connecting with a pair of charging terminals installed on the vehicle; a first wire installed on the station at a location inside or outside of the working area and being formed as a circular shape having a center; and a second wire installed on the station to project toward the location of the first wire, the second wire being connected to the boundary wire and being formed as a shape that is symmetrical with respect to a center line obtained by connecting the midpoint of the pair of charging terminals and the center of the first wire.

According to a second aspect of the present invention, there is provided a guide for guiding an autonomously navigating utility vehicle equipped with a prime mover powered by a battery to travel about a working area delineated by a boundary wire, to a charging station for charging the battery, comprising: a pair of charging terminals installed on the station to be spaced apart each other via a first midpoint; a first wire installed on the station at a location inside or outside of the working area and being formed as a circular shape having a center; a second wire installed on the station to project toward the location of the first wire, the second wire being connected to the boundary wire and being formed as a shape that is symmetrical with respect to a first center line obtained by connecting the first midpoint of the pair of charging terminals and the center of the first wire; a pair of charging terminals installed on the vehicle to be connected with the pair of charging terminals installed on the station, the pair of charging terminals installed on the vehicle being spaced apart each other via a second midpoint; a first magnetic sensor installed on the vehicle at a location on a second center line extending from the second midpoint of the pair of charging terminals installed on the vehicle in a forward direction of the vehicle, the first magnetic sensor being adapted to produce an output indicating magnetic field generated by electric current supplied to the first wire; a pair of second magnetic sensors installed on the vehicle to be spaced apart each other and symmetrically with respect to the second center line, the pair of second magnetic sensors being adapted to produce outputs indicating magnetic field generated by electric current supplied to the first wire and the second wire; and a travel controlling unit that controls operation of the prime mover to make the vehicle move to bring the second center line into coincidence with the first center line based on the outputs of the first magnetic sensor and the pair of second magnetic sensors.

BRIEF DESCRIPTION OF THE DRAWINGS

The objects, features, and advantages of the present invention will become clearer from the following description of embodiments in relation to the attached drawings, in which.

DETAILED DESCRIPTION OF THE INVENTION

Figure 1:
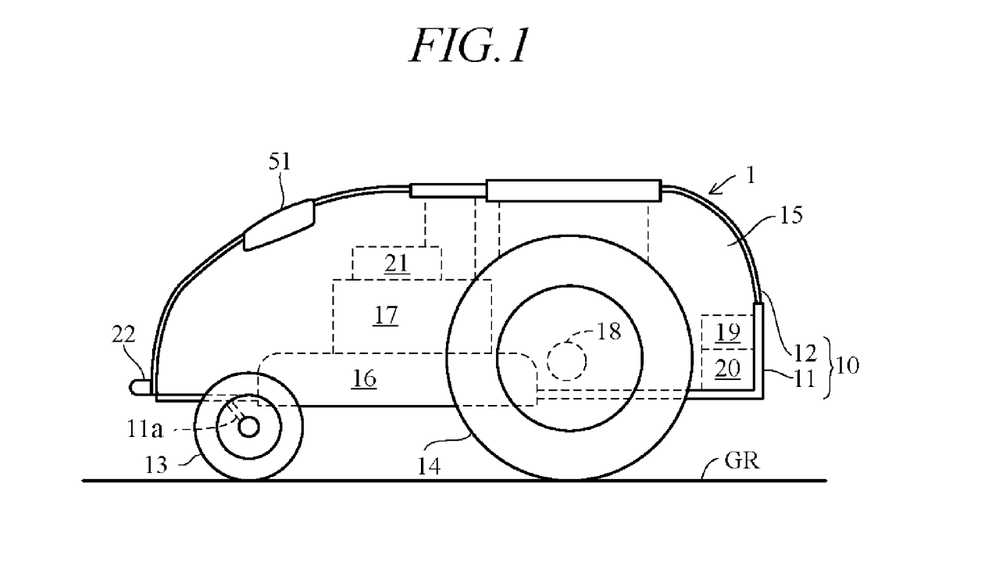
FIG. 1 is a side view schematically illustrating configuration of an autonomously navigating utility vehicle for a charging station or a guide according to an embodiment of this invention.

An embodiment of the present invention is explained with reference to FIGS. 1 to 12 in the following. FIG. 1 is a side view schematically illustrating the configuration of an autonomously navigating utility vehicle according to an embodiment of the present invention, and FIG. 2 is plan view of the same.

The autonomously navigating utility vehicle of the present invention can be embodied in the form of various types of utility vehicle and particularly as a lawn mower for lawn or grass mowing work. In the following, the forward direction (longitudinal direction) of the utility vehicle in plan view and the vehicle width direction perpendicular to the forward direction are defined as the forward-rearward direction and the leftward-rightward direction, respectively, and the height direction of the utility vehicle is defined as the upward-downward direction. The configuration of the constituents is explained in line with these definitions.

Figure 2:
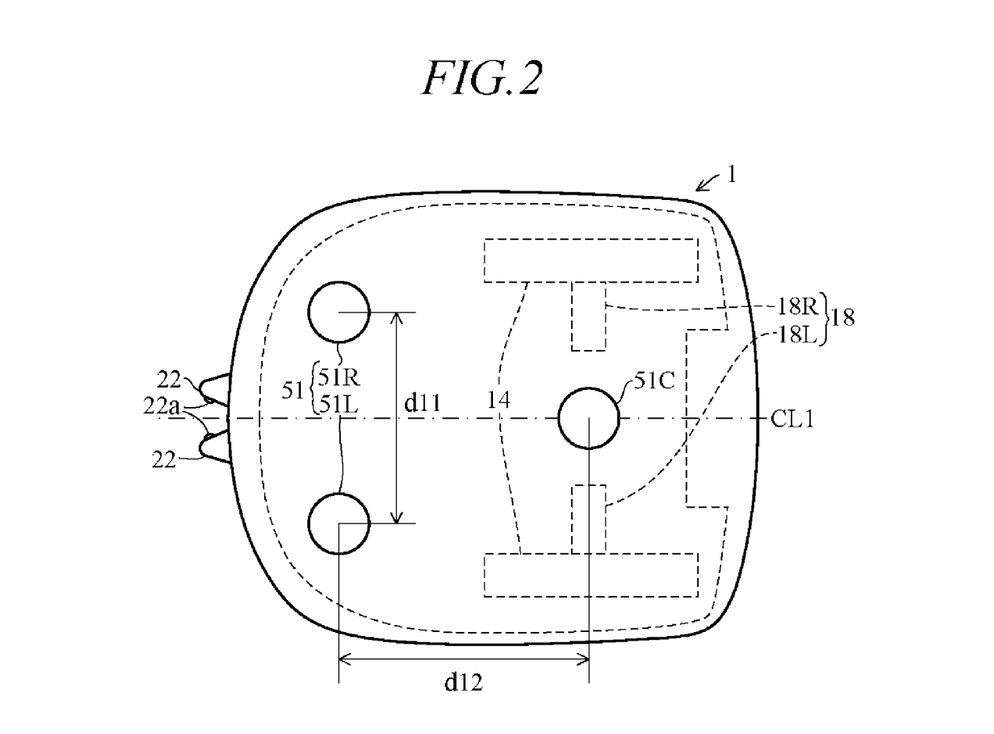
FIG. 2 is a plan view schematically illustrating the configuration of the utility vehicle of FIG. 1.

As shown in FIGS. 1 and 2, an autonomously navigating utility vehicle (hereinafter called simply "vehicle") 1 is equipped with a body 10 having a chassis 11 and a frame 12, along with a pair of left and right front wheels 13 and a pair of left and right rear wheels 14 that support the body 10 above a ground surface GR so as to be capable of travel.

The front wheels 13 are rotatably fastened through stays 11a to the front end of the chassis 11. The rear wheels 14, which are greater in diameter than the front wheels 13, are rotatably fastened directly to the rear end of the chassis 11. The weight and size of the vehicle 1 are such that it can be transported by an operator. As an example can be cited a vehicle 1 whose total length (forward-rearward direction length) is about 500 mm, total width about 300 mm, and height about 300 mm.

A work unit 16, a work motor 17 for driving the work unit 16, travel motors (prime mover) 18 for driving the rear wheels 14, a battery charging unit 19 and a battery (secondary battery) 20 are provided or placed in an internal space 15 of the vehicle 1 enclosed by the chassis 11 and the frame 12.

The work unit 16 comprises a rotor and blades attached to the rotor and has a substantially disk-like shape as a whole. A rotating shaft is installed vertically at the center of the rotor and the work unit 16 is configured to enable adjustment of the height of the blades above the ground GR through a height regulating mechanism 21 by the operator. The height regulating mechanism 21 is equipped with, for example, a screw operable by the operator. The work motor 17 is constituted by an electric motor installed above the work unit 16, and an output shaft thereof is connected to the rotating shaft of the rotor to rotate the blades unitarily with the rotor.

The travel motors 18 comprise a pair of electric motors 18L and 18R installed on the right and left inner sides of the left and right rear wheels 14. Output shafts of the travel motors 18L and 18R are connected to rotating shafts of the left and right rear wheels 14, respectively, so as each to independently drive or rotate the left or right rear wheel 14. In other words, the vehicle 1 comprises the front wheels 13 as non-driven free wheels and the rear wheels 14 as driving wheels, and the travel motors 18L and 18R each independently rotates one of the rear wheels 14 normally (rotation to move forward) or reversely (rotation to move reverse). By establishing a difference between the rotating speeds of the left and right rear wheels 14, the vehicle 1 can be turned to an arbitrary direction.

For example, when the left and right rear wheels 14 are both rotated normally and the rotational speed of the right rear wheel 14 is greater than the rotational speed of the left rear wheel 14, the vehicle 1 turns left at a turning angle θ in accordance with the speed difference. Conversely, when the rotational speed of the left rear wheel 14 is greater than the rotational speed of the right rear wheel 14, the vehicle 1 turns right at a turning angle θ in accordance with the speed difference. When one of the left and right rear wheels 14 is rotated normally and the other reversely both at the same speed, the vehicle 1 turns on the spot.

Figure 7:
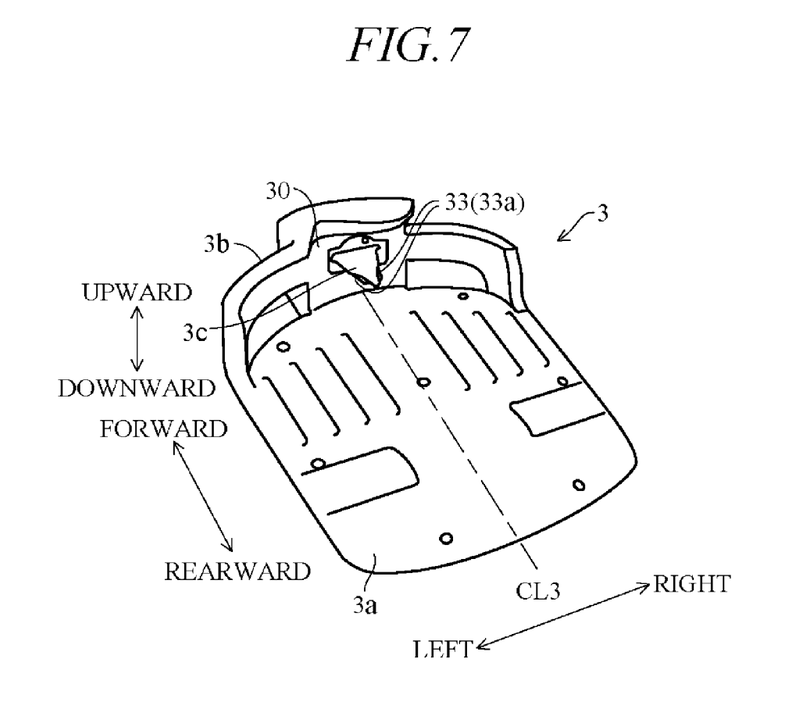
FIG. 7 is a perspective view showing the charging station according to the embodiment of this invention.

The charging unit 19, which includes an AC-DC converter, is connected by wires to charging a pair of left-right charging terminals 22 installed at the front end of the frame 12 and is also connected by wires to the battery 20. The charging terminals 22 are spaced apart each other by a midpoint and have two contacts 22a, and the battery 20 can be charged by connecting the charging terminals 22 through the contacts 22a to a charging station 3 (FIG. 7). The battery 20 is connected through wires to the work motor 17 and the travel motors 18, and the work motor 17 and the travel motors 18 are driven by power supplied from the battery 20 through drivers.

Figure 3:
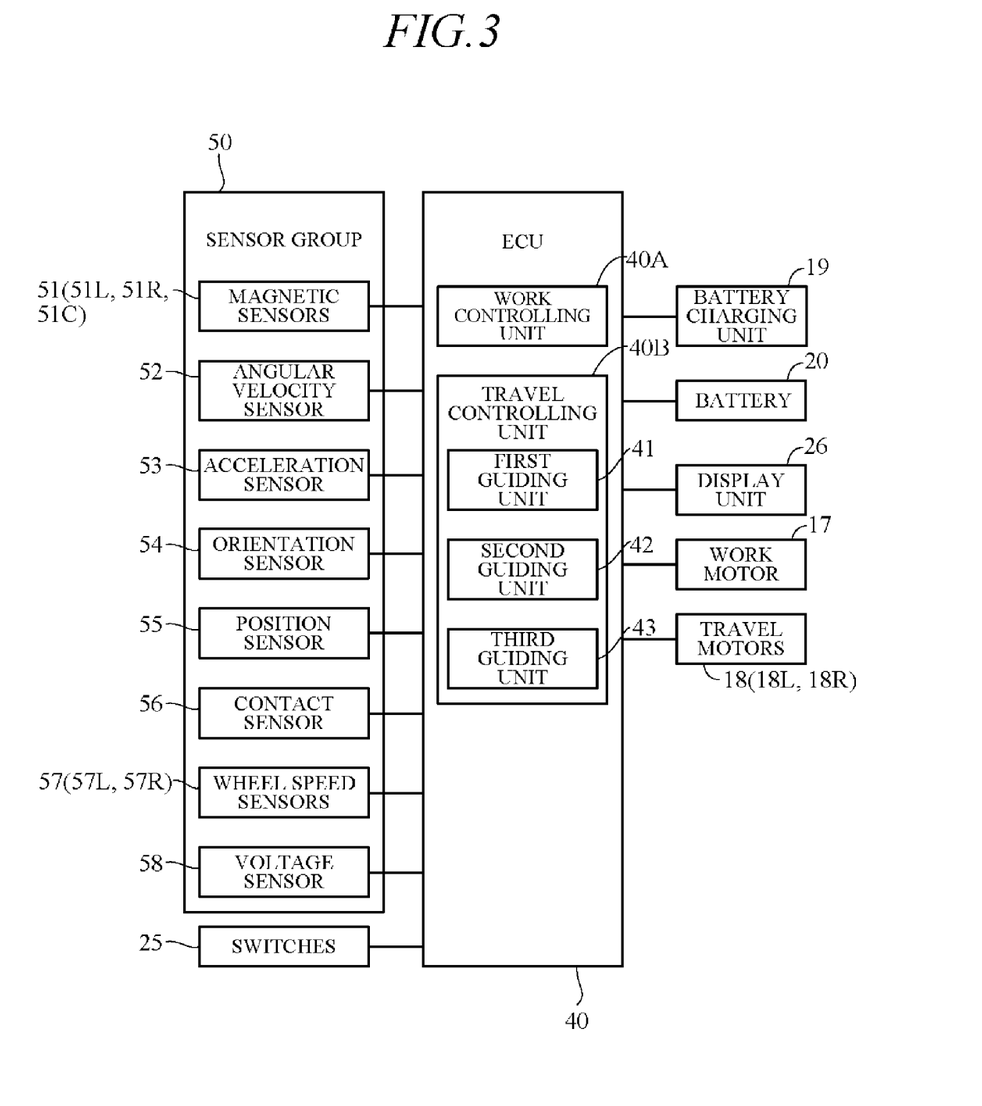
FIG. 3 is a block diagram showing the configuration of an Electronic Control Unit for controlling the vehicle of FIG. 1.

FIG. 3 is a block diagram showing the configuration of an Electronic Control Unit (ECU) for controlling the vehicle 1 according to the present embodiment. As shown in FIG. 3, the ECU 40 is mounted on the vehicle 1. The ECU 40 has a microcomputer of a configuration including an arithmetic processing unit (CPU) and memories ROM, RAM and other peripheral circuits.

The ECU 40 is connected with a group of sensors collectively designated by reference numeral 50 that detects various conditions of the vehicle 1, charging unit 19, battery 20, a group of switches 25, display unit 26, work motor 17 and travel motors 18 (18R, 18L). The group of sensors 50 includes a group of magnetic sensors 51 (51R, 51L, 51C), an angular velocity sensor 52, an acceleration sensor 53, an orientation sensor 54, a position sensor 55, a contact sensor 56, a pair of wheel speed sensors 57 (57R, 57L), and a voltage sensor 58.

The group of magnetic sensors 51 includes a pair of sensors (a pair of second sensors) 51R, 51L which are installed laterally spaced apart on the front end of the vehicle 1. More specifically, as shown in FIG. 2, the magnetic sensors 51R and 51L are installed laterally symmetrically with respect to a center line CL running in the straight forward direction along the widthwise center of the vehicle 1 and spaced apart each other by a predetermined first distance d11.

In addition, the sensors 51 include a third sensor (first sensor) 51C which is installed on the center line CL in the rear of the sensors 51R, 51L at a location remote from the sensors 51R, 51L by a predetermined second distance d12. The predetermined second distance d12 corresponds to a distance from the center of the sensors 51R, 51L to the rotating axis of the rear wheels 14. The magnetic sensors 51R, 51L, 51C have same structures and produce outputs indicating magnitude of magnetic field (magnetic field strength (intensity) H). The sensors 51R, 51L are sometimes referred to as "front sensors" and 51C as "rear sensors".

The angular velocity sensor 52 produces an output indicating angular velocity (yaw rate) occurring around a height direction (z-axis) of the vehicle 1, from which a turning angle θ of the vehicle 1 around the z-axis can be calculated. The acceleration sensor 53 produces an output indicating acceleration acting on the vehicle 1 in the directions of three orthogonal axes (x-axis, y-axis, and z-axis). The position sensor 55 is constituted as a GPS sensor that receives electromagnetic waves from GPS satellite and produces an output indicating a position of the vehicle 1.

The contact sensor 56 produces an output of ON signal when the frame 12 is detached from the chassis 11 owing to contact with an obstacle or the like. Each of the pair of wheel speed sensors 57R, 57L produces an output indicating wheel speed of one of the left and right rear wheels 14, from which a travel distance of the vehicle 1 can be calculated. The voltage sensor 58 produces an output indicating a residual voltage of the battery 20.

The switches 25 have various switches provided to be manipulatable by the operator and includes a main switch for inputting various commands, inter alia, start of vehicle 1 operation, and an emergency stop switch for stopping the vehicle 1 in an emergency. The display unit 26 has a display that shows various information to be supplied to the operator. The switches 25 and display unit 26 may be constituted by a touch panel.

Figure 4:
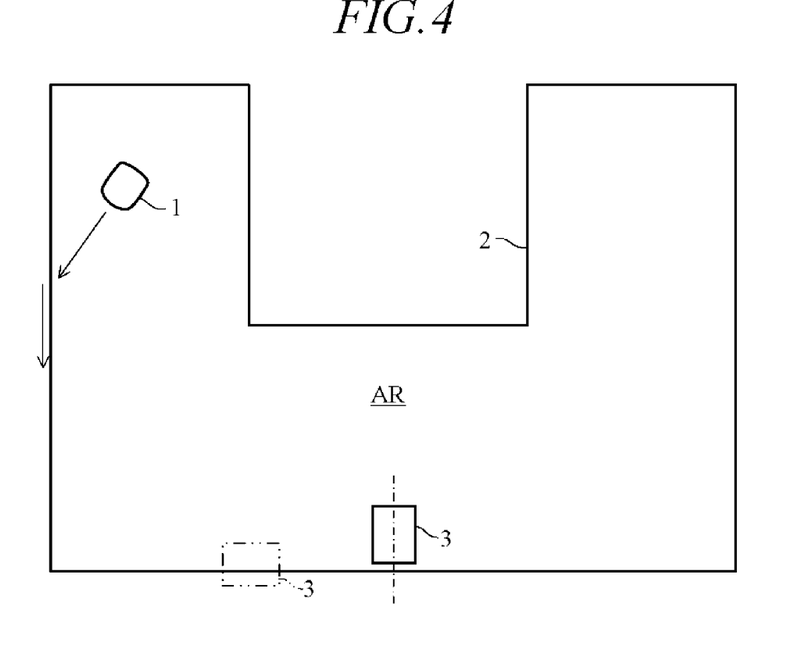
FIG. 4 is a diagram showing an example of a working area.

The vehicle 1 configured as described above performs a task while autonomously navigating within a predefined working area. FIG. 4 is a diagram showing an example of a working area AR. The working area AR is, for example, delineated by a boundary wire 2 that constitutes a boundary line (L0) and is laid beforehand (e.g., buried a predetermined depth under the ground surface GR). A magnetic field is generated in the working area AR around the boundary wire 2 by passing electric current through the boundary wire 2. The working area AR defines the travel range of the vehicle 1 and may include not only area(s) to be serviced but also area(s) not to be serviced. The charging station 3 for charging the battery 20 is situated in the proximity of the boundary wire 2, more precisely at a location inside the wire 2.

Figure 5:
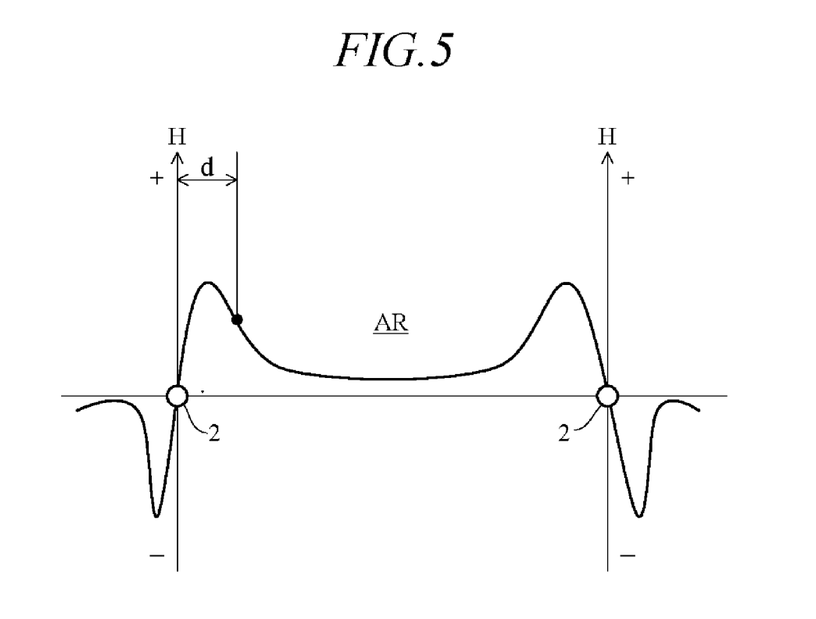
FIG. 5 is a diagram showing a relationship between distance from the boundary wire and magnetic field strength.
Figure 6:
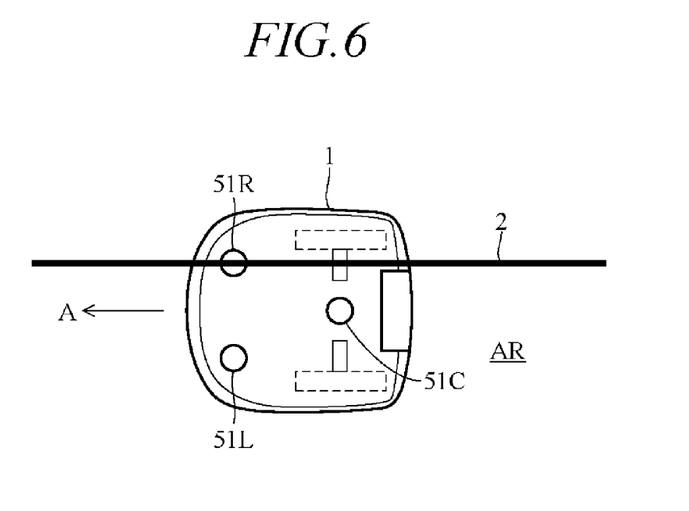
FIG. 6 is a diagram showing operation of the utility vehicle in trace mode.

FIG. 5 is a diagram showing a relationship between distance d from the boundary wire 2 and magnetic field strength H. As indicated in FIG. 6, magnetic field strength H varies with distance d from the boundary wire 2. Specifically, magnetic field strength H is 0 above the boundary wire 2, positive inside the working area AR, and negative outside the same. When work is in progress, the ECU 40 reads outputs of the magnetic sensors 51L and 51R, and when the output is minus, turns the vehicle 1 toward inside the working area AR at a random angle based on, for example, the output of the angular velocity sensor 52. As a result, work can be carried out inside the working area AR while the vehicle 1 is being driven (forward at random, for example).

In the present embodiment, the vehicle 1 operates in work mode, trace mode and return mode in response to control commands sent from the ECU 40 in accordance with programs prepared beforehand and memorized in the memory (ROM). In work mode, the vehicle 1 works (mows lawn or grass) while autonomously navigating in the working area AR. In return mode, the vehicle 1 is returned to the charging station 3 when the battery 20 requires charging. In trace mode, the vehicle 1 is driven along the boundary wire 2. Trace mode is executed before work mode to ascertain the working area AR.

FIG. 6 is a diagram showing operation of the vehicle 1 in trace mode. As shown in FIG. 6, in trace mode the vehicle 1 is driven by commands from the ECU 40 to circuit along the boundary wire 2 with one of the pair of magnetic sensors 51R and 51L (e.g., 51L) positioned inside the boundary wire 2 and so that the other magnetic sensor (e.g., 51R) moves above the boundary wire 2 in the direction of arrow A (direction of y-axis). Specifically, the ECU 40 monitors output of the magnetic sensor 51R and controls operation of the travel motors 18L and 18R so that magnetic field strength H detected by the magnetic sensor 51R stays at 0.

For example, when magnetic field strength H detected from the output of the magnetic sensor 51R becomes positive, the vehicle 1 is turned rightward by decelerating right travel motor 18R and accelerating left travel motor 18L. On the other hand, when magnetic field strength H detected from the output of the magnetic sensor 51R becomes negative, the vehicle 1 is turned leftward by accelerating the right travel motor 18R and decelerating the left travel motor 18L. As a result, the right magnetic sensor 51R is brought near the boundary wire 2 and magnetic field strength H detected by the right magnetic sensor 51R is maintained at 0.

Trace mode is started from a state in which the terminals 22 of the vehicle 1 are connected to a pair of charging terminals 33 installed on the charging station 3 to be spaced apart each other via a midpoint and ends when the terminals 22 again connect to the terminals 33 after the vehicle 1 makes a circuit along the boundary wire 2. The position of the vehicle 1 from the starting to the end in trace mode can be obtained from the output of the position sensor 55. The ECU 40 identifies position coordinates of the vehicle 1 in the working area AR relative to the origin (charging station 3).

In this connection, when the charging station 3 is installed above the boundary wire 2 as depicted, for example, in a dotted-line representation in FIG. 4, the vehicle 1 can be returned to the charging station 3 during return mode by driving (trace driving) the vehicle 1 along the boundary wire 2 on the basis of the outputs from magnetic sensors 51.

However, when the vehicle 1 is to be returned by trace driving, the charging station 3 must be installed above the boundary wire 2 and in a direction parallel to the boundary wire 2, so that installation of the charging station 3 is considerably restricted. Therefore, in the present embodiment, the charging station 3 is configured as set out below in order to enhance freedom of arrangement of the charging station 3.

FIG. 7 is a perspective view of the charging station 3 (shown by solid-line in FIG. 4). For convenience of explanation in the following, three orthogonal directions shown in the drawing are respectively defined as forward-rearward direction or length direction), lateral direction or width direction and vertical direction or height direction of the charging station 3. Illustration of the boundary wire 2 is omitted in FIG. 7. Orientation of the charging station 3 is expressed by its length direction (orientation of center line CL3 in FIG. 7).

As shown in FIG. 7, the charging station 3 has a base 3a onto which the vehicle 1 is moved during charging, a guide member 3b standing on a front end of the base 3a for regulating position of the vehicle 1 during charging, and a projection 3c of substantially triangular shape which protrudes rearward from a laterally central region at an upper end of the guide member 3b.

A base plate 30 having a printed circuit board therein is provided on a front side of the laterally central region of the guide 3b, and the pair of charging terminals 33 are provided on opposite lateral side surfaces of the projection 3c, symmetrically with respect to the longitudinal center line (first center line) CL3 bisecting the charging station 3. The projection 3c is configured to connect or enter between the pair of left-right charging terminals 22 of the vehicle 1. As a result, the terminals 22 and 33 (more exactly, contacts 22a and 33a of the terminals 22 and 33) connect with one another to charge the battery 20.

Figure 8:
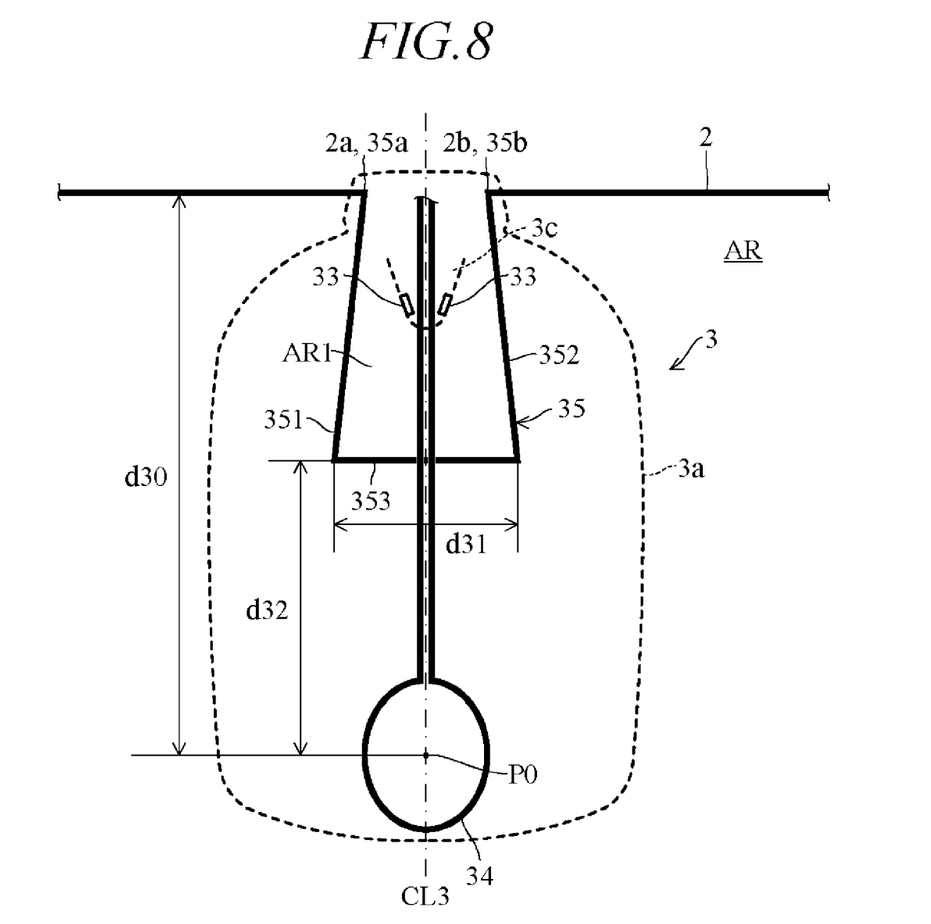
FIG. 8 is a plan view showing main features, particularly the wire arrangement of the charging station of FIG. 7.

In the present embodiment, the charging station 3 is installed at a location inside or outside of the working area, more specifically inside the working area AR to be perpendicular to the boundary wire 2, as shown by the solid-line representation in FIG. 4. FIG. 8 is a plan view showing main features of the charging station 3, particularly the wire arrangement, and FIG. 9 is a block diagram showing the electric connection of the charging station 3.

Figure 9:
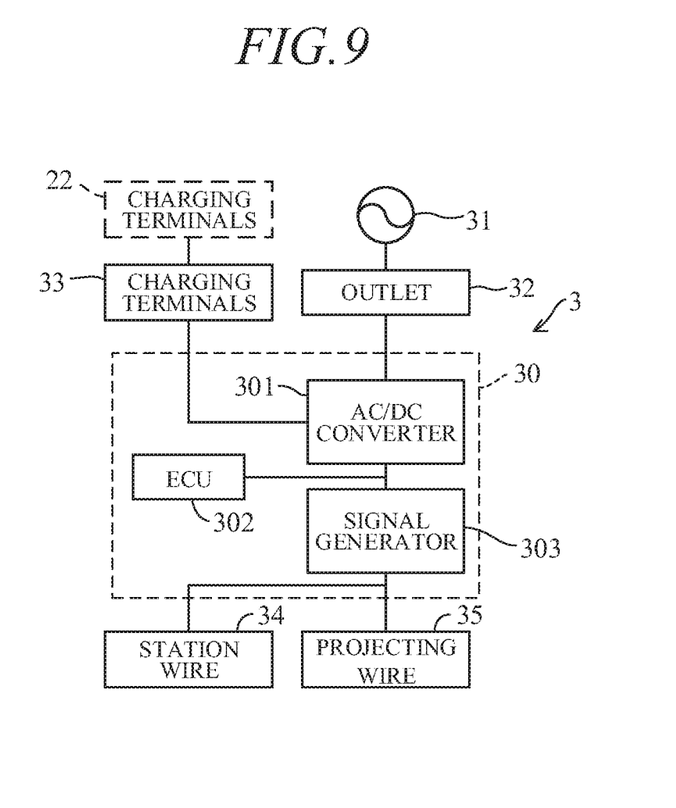
FIG. 9 is a block diagram showing the electric connection of the charging station of FIG. 7.

As shown in FIG. 9, on the circuit board in the base plate 30 of the charging station 3, there are installed an AC/DC converter 301, an ECU (electronic control unit) 302 for controlling operation of the AC/DC converter 301, and a signal generator (electric current supplier) 303 for generating signals by supplying alternating currents to a station wire (first wire) 34 and a projecting wire (second wire) 35 connected thereto.

The AC/DC converter 301 is connected, on the one hand, to a commercial power supply 31 through an outlet 32 and is connected, on the other hand, to the terminals 22 through the terminals 33. Alternating current from the commercial power supply 31 is stepped down to an appropriate voltage by the AC/DC converter 301. When the vehicle 1 returns to the charging station 3 and the contacts 22a of the terminals 22 of the vehicle 1 contact the contacts 33a of the terminals 33, power stepped down by the AC/DC converter 301 is supplied to the vehicle 1 to charge the battery 20. In response to commands from the ECU 302, the signal generator 303 repeatedly supplies current to the station wire 34 and the projecting wire 35 alternately to generate signals of magnetic field of mutually different timing from the two. The signals of magnetic field generated around the station wire 34 is called a "first pattern" and that generated around the projecting wire 35 is called a "second pattern" that is different from the first pattern.

As shown in FIG. 8, the station wire 34 and projecting wire 35 are installed inside or beneath the base 3a at vertically offset levels (more precisely at offset level in the direction of z-axis) so as not to intersect each other. As shown there, the projecting wire 35 is connected in series to the boundary wire 2 but the station wire 34 is not connected to the boundary wire 2.

The station wire 34 is formed as an overall circular shape in plan view comprising a circular shape portion having a center (P0) and line segments connected to the circular shape portion. The station wire 34 is installed inside the working area AR at a predetermined third distance (amount of separation) d30 from the boundary wire 2. The center point P0 of the circular shape portion of the station wire 34 is located on a perpendicular bisector of an imaginary line segment (parallel to the line segments) connecting the pair of terminals 33, i.e., on the center line CL3 of the charging station 3. The center line CL3 is obtained by connecting the midpoint of the charging terminals 33 and the center point (center) P0 of the station wire 34.

The station wire 34 is for generating a magnetic field indicating the position of the charging station 3 and the diameter of the circle is determined taking strength of the magnetic field strength into account. To give an example, the diameter of the circle is about equal to the size of the magnetic sensors 51.

The projecting wire 35 is series-connected at opposite ends 35a and 35b to ends 2a and 2b of the boundary wire 2 and is formed to project in trapezoidal shape in plan view toward the location of the station wire 34. Specifically, the projecting wire 35 comprises wire segments (legs) 351 and 352 extending substantially perpendicular from the ends 2a and 2b of the boundary wire 2 into the working area AR interior, and a wire segment (base) 353 connecting the wire segments 351 and 352 to each other, and is formed to be laterally symmetrical with respect to the center line CL3. Strictly speaking, distance between the ends 35a and 35b is shorter than length of the wire segment 353, so that projecting wire 35 has a trapezoidal shape.

Distance d31 between the wire segments 351 and 352 and distance d32 between the center point P0 of the station wire 34 and the wire segment 353 are determined with consideration to the arrangement of the magnetic sensors 51L, 51R and 51C provided on the vehicle 1.

Figure 10:
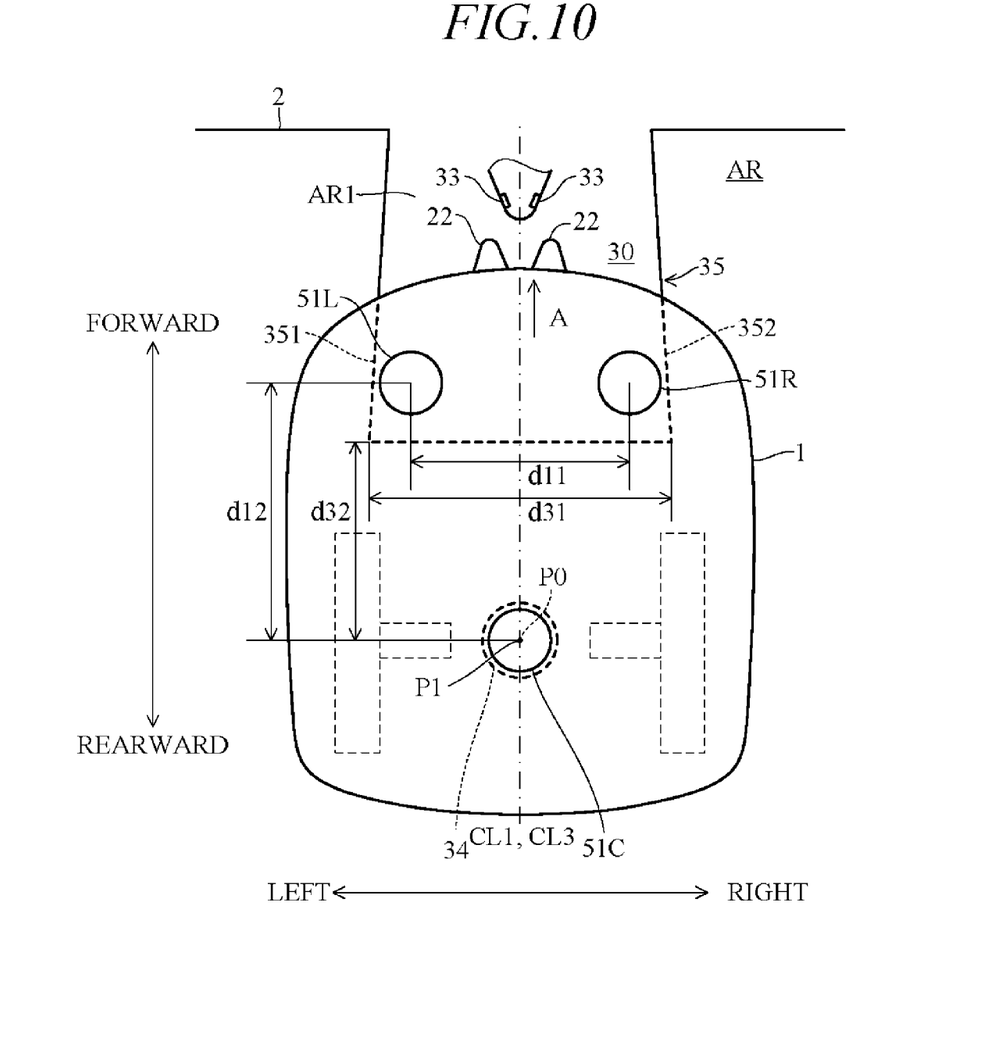
FIG. 10 is a diagram showing a guide for guiding the utility vehicle to the charging station according to the embodiment using positional relationship among the wires and the magnetic sensors.

FIG. 10 is a diagram showing a guide for guiding the utility vehicle to the charging station according to the embodiment using positional relationship among the wires 34 and 35 and the magnetic sensors 51L, 51R and 51C. In FIG. 10, the magnetic sensor 51C is located or placed on the center point P0 of the station wire 34 where the center line CL1 of the vehicle 1 and center line CL3 of the charging station 3 are coincident. At this time, the pair of left-right terminals 33 of the charging station 3 and the pair of left-right terminals 22 of the vehicle 1 face each other across a predetermined gap. The posture of the vehicle 1 shown in FIG. 10 is called "target posture". If the vehicle 1 guided to the target posture moves forward in the direction of arrow A toward the terminals 33, the terminals 22 connect with the terminals 33, namely, the vehicle 1 can dock with the charging station 3.

As shown in FIG. 10, the distance d31 between the wire segments 351 and 352 is longer than the distance d11 between the left-right magnetic sensors 51L and 51R of the vehicle 1 (in other words the distance d11 is smaller than the distance d31 between the two legs of the trapezoid), and the distance d32 between the center point P0 of the station wire 34 and the wire segment 353 is shorter than the distance d12 between the front-rear magnetic sensors 51L and 51C. Therefore, when the vehicle 1 is in the target posture, the front magnetic sensors 51L and 51R are located in an inner area AR1 inside the projecting wire 35.

With respect to the charging station 3 mentioned in the above, the ECU 40 of the vehicle 1 is configured to guide the vehicle 1 to the charging station 3 via the target posture. Specifically, as shown in FIG. 3, the ECU 40 comprises as functional constituents a work controlling unit 40A that controls operation of the work motor 17 and a travel controlling unit 40B that controls operation of the travel motors 18. The travel controlling unit 40B controls operation of the travel motors 18 in a different way in each of the trace mode, work mode and return mode.

In the particular case of return mode, the travel controlling unit 40B controls operation of the travel motors 18 based on the outputs of the magnetic sensors 51L, 51R and 51C. As constituent members for return mode, the travel controlling unit 40B comprises a first guiding unit 41 that guides the vehicle 1 to a position (target position) where the rear magnetic sensor 51C is placed on the center point P0 of the station wire 34, a second guiding unit 42 that guides the vehicle to turn around the target position such that the center line CL1 of the vehicle 1 is brought into coincidence with the center line CL3 of the charging station 3 into coincidence, and a third guiding unit 43 that guides the vehicle 1 to move forward (to the target posture) to connect the terminals 22 and 33 with one another.

Figure 11:
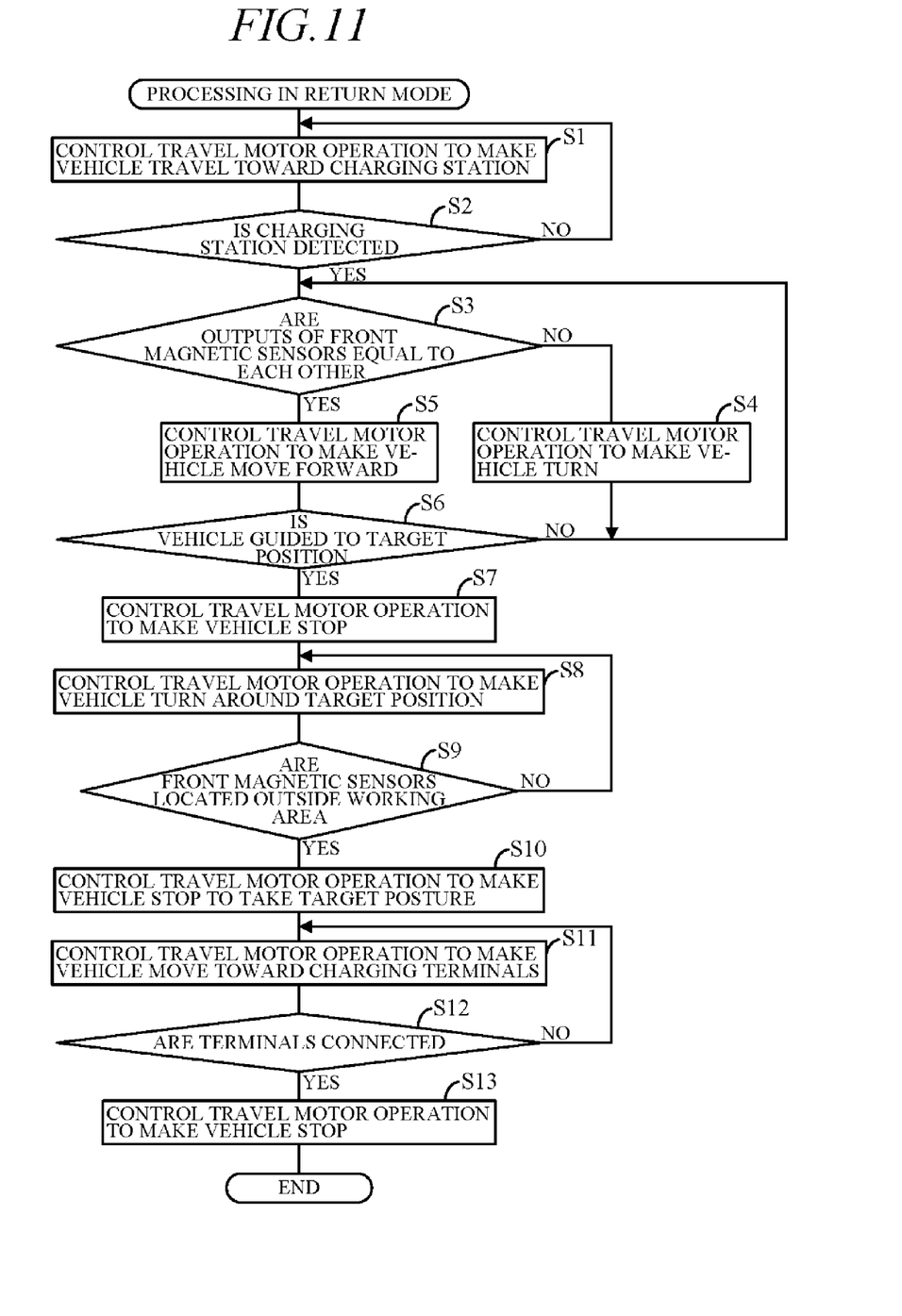
FIG. 11 is a flowchart showing processing (return processing) executed by the ECU of FIG. 3.

FIG. 11 is a flowchart showing an example of processing (return processing) by the ECU 40, particularly by the travel controlling unit 40B. The processing shown in this flowchart is commenced upon discrimination, while the vehicle 1 is traveling in work mode, that the output of the voltage sensor 58 has fallen to or below the predetermined value and the battery 20 requires charging.

First, in S1, operation of the travel motors 18 is controlled by outputting control commands thereto to make the vehicle 1 travel toward the charging station 3. Position (latitude and longitude) of the charging station 3 can be ascertained by driving the vehicle 1 in trace mode and memorizing the output of the position sensor 55 in memory (RAM) when the terminals 22 and 33 connect with one another. On the other hand, current position of the vehicle 1 during traveling can be detected by the position sensor 55, and orientation thereof can be detected by the orientation sensor 54 or the angular velocity sensor 52. Therefore, in S1, the vehicle 1 can be made to approach the charging station 3 based on the outputs of the position sensor 55 and of the orientation sensor 54 or angular velocity sensor 52.

Next, in S2, it is determined whether the magnetic sensors 51 detects the charging station 3. In return mode, electric current is supplied to the boundary wire 2 in the first pattern in response to a command from the ECU 302 of the charging station 3, whereby the boundary wire 2 and projecting wire 35 generate magnetic fields of the first pattern therearound. Meanwhile, current of the second pattern different from the first pattern is supplied to the station wire 34, whereby the magnetic field of the second pattern different from the first pattern is generated around the station wire 34.

Figure 12A:
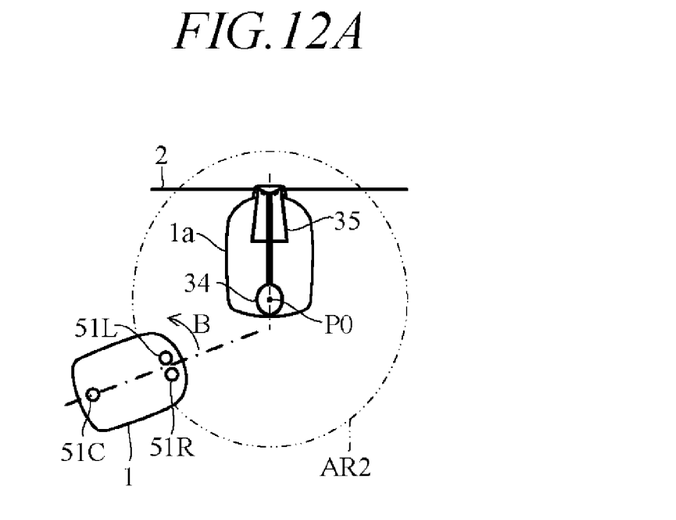
FIGS. 12A, 12B, 12C, and 12D are diagrams explaining the processing of the flowchart of FIG. 10.

Thus in S2, it is determined whether the magnetic sensors 51 detects the magnetic field of the second pattern around the station wire 34, namely, whether the vehicle 1 is near the station wire 34. As shown in FIG. 12A, when the magnetic sensors 51 enter a magnetic field detection region AR2 centered on the station wire 34, the result in S2 is YES.

When the result in S2 is NO, the program returns to S1, but when the result is YES, the program goes to S3, in which it is determined whether the outputs (magnetic field strengths) H of the second pattern magnetic field detected by the front magnetic sensors 51L and 51R are equal to each other, namely, whether the distances from the magnetic sensors 51L and 51R to the station wire 34 are equal. If the center line CL1 of the vehicle 1 is present on the center point P0 of the station wire 34, the outputs of the magnetic sensors 51L and 51R are equal.

Figure 12B:
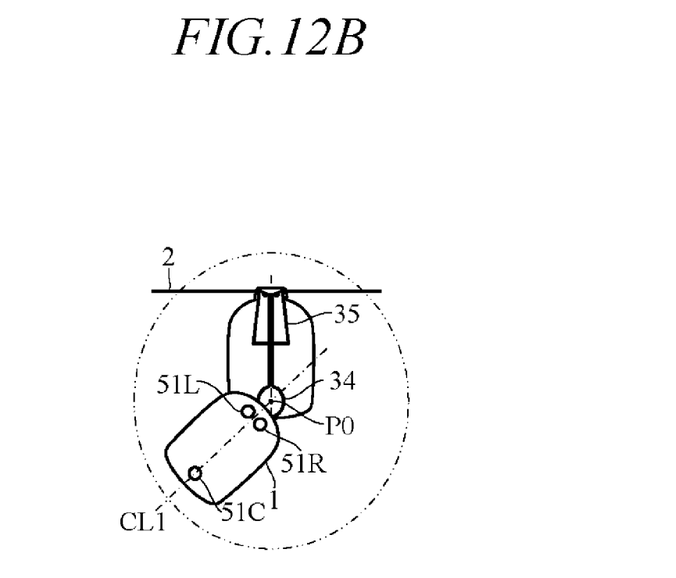

When the outputs of the magnetic sensors 51L and 51R differ, the result in S3 is NO and the program goes to S4, in which operation of the travel motors 18 is controlled to make the vehicle 1 turn in order to bring the detection values H of the magnetic sensors 51L and 51R equal. For example, in the situation shown in FIG. 12A, the output of the left magnetic sensor 51L is greater than that of the right magnetic sensor 51R because the left magnetic sensor 51L is closer to the station wire 34. In this case, the vehicle 1 is rotated leftward (direction of arrow B) in S4 to make the outputs of left-right the magnetic sensors 51L and 51R coincide, whereafter the program returns to S3. As a result, the vehicle 1 approaches the station wire 34 as shown in FIG. 12B.

On the other hand, when the result in S3 is YES and the program goes to S5, in which operation of the travel motors 18 is controlled to make the vehicle 1 move forward.

Next, in S6, it is determined whether the magnetic sensor 51C entered inside the station wire 34 based on the value of the second pattern magnetic field detected by the rear magnetic sensor 51C, strictly speaking, it is determined whether the vehicle 1 is guided to the target position where the magnetic sensor 51C is placed above the center point P0 of the station wire 34.

When the result in S6 is NO, the program returns to S3. However, when the result is YES, the program goes to S7, in which operation of the travel motors 18 is controlled to make the vehicle 1 stop.

Next, in S8, operation of the travel motors 18 is controlled to guide the vehicle 1 to turn around the target position such that the center line CL1 of the vehicle 1 is brought into coincidence with the center line CL3 of the charging station 3 based on the outputs of the first pattern magnetic field generated around the boundary wire 2 (projecting wire 35) detected by the front magnetic sensors 51L and 51R.

Figure 12C:
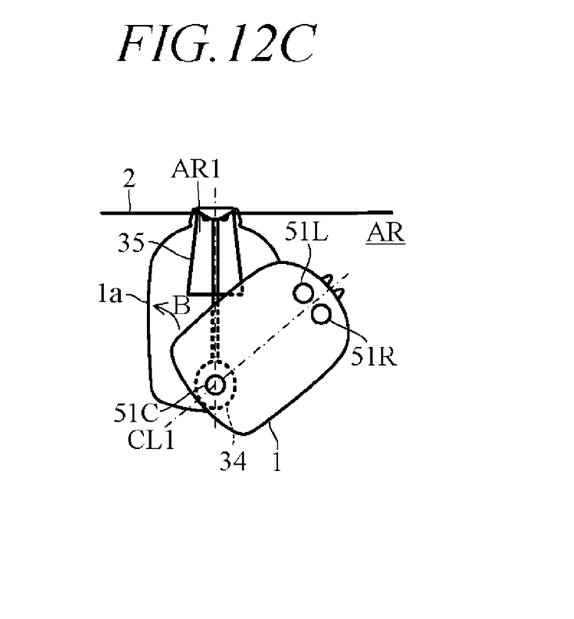

For example, when both magnetic sensors 51L and 51R are located in the working area AR, as shown in FIG. 12C, the vehicle 1 is rotated in the direction of the magnetic sensor exhibiting the larger detection value H (in this example, direction of arrow B; left magnetic sensor 51L). On the contrary, when one of the magnetic sensors 51L and 51R (e.g., 51L) goes outside the working area AR in the course of turning the vehicle 1, i.e., when it is comes to be present in the area AR1 inside the projecting wire 35, the vehicle 1 is turned in the direction of the left magnetic sensor 51L located outside.

Next, in S9, it is determined whether both of the front magnetic sensors 51L and 51R are located outside the working area AR based on the outputs of the detection values of the magnetic sensors 51L and 51R.

Figure 12D:
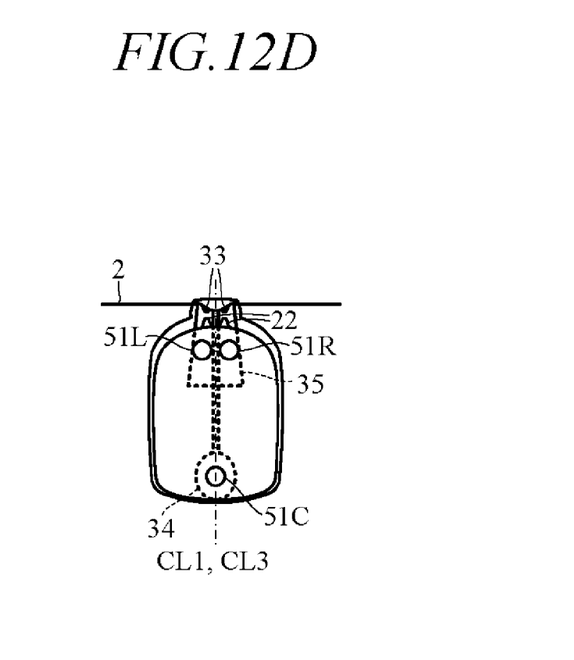

When the result in S9 is NO, the program returns to S8. But when the result in S9 is YES, the program goes to S10, in which operation of the travel motors 18 is controlled to make the vehicle 1 stop. As shown in FIG. 12D, this puts the vehicle 1 in the target posture by aligning the center line CL1 of the vehicle 1 with the center line CL3 of the charging station 3 so that the terminals 22 of the vehicle 1 face the terminals 33 of the charging station 3.

Next, in S11, operation of the travel motors 18 is controlled to make the vehicle 1 move forward toward the charging terminals (33).

Then, in S12, it is determined whether the terminals 22 are connected with the terminals 33 based on the output of the voltage sensor 58, for example. Namely, it is determined whether docking was accomplished.

When the result in S12 is NO, the program returns to S11, but when the result is NO, the program goes to S13, operation of the travel motors 18 is controlled to make the vehicle 1 stop.

This completes the return processing by the travel controlling unit 40B, which the processing of S1 to S7 is executed in the first guiding unit, the processing of S8 to S10 in the second guiding unit, and the processing of S11 to S13 in the third guiding unit.

As stated above, the present embodiment is configured to have, in its first aspect, a charging station (3) for charging a battery (20) installed on an autonomously navigating utility vehicle (1) equipped with a prime mover (18) powered by the battery (20) to travel about a working area (AR) delineated by a boundary wire (2) in order to perform work autonomously, characterized by: a pair of charging terminals (33) installed on the station (3) to be spaced apart each other via a midpoint, the pair of charging terminals (33) being capable of connecting with a pair of charging terminals (22) installed on the vehicle (1); a first wire (34) installed on the station (3) at a location inside or outside of the working area (AR) and being formed as a circular shape having a center (P0); and a second wire (35) installed on the station (3) to project toward the location of the first wire (34), the second wire (35) being connected to the boundary wire (2) and being formed as a shape that is symmetrical with respect to a center line (CL3) obtained by connecting the midpoint of the pair of charging terminals (33) and the center (P0) of the first wire (34).

With this, it becomes possible to enhance freedom of charging station 3 arrangement by enabling installation of the charging station 3 at an arbitrary position inside (or outside) the boundary wire 2 rather than on the boundary wire 2.

In the charging station, the first wire (34) has a circular shape portion and line segments connected to the circular shape portion. More specifically, the second wire (35) is formed as a shape of trapezoid having an inner area (AR1), and the circular shape portion of the first wire (34) is installed on the station (3) at a position outside of the inner area (AR1) of the second wire (35).

With this, in addition to the advantages and effects mentioned above, the vehicle 1 can approach the station wire 34 from any direction and the vehicle 1 can be accurately guided as desired. Here, the circular shape in this case is defined to include substantially (approximately) circular shapes not circular by strictest definition.

The charging station further includes an electric current supplier (303) that supplies electric current to the first wire (34) to generate magnetic field of a first pattern around the first wire (34) and supplies electric current to the second wire (35) to generate magnetic field of a second pattern around the second wire (35), the second pattern being different from the first pattern generated around the first wire (34).

With this, in addition to the advantages and effects mentioned above, it becomes possible to distinguish the magnetic field between one from the projecting wire 35 (boundary wire 2) and one from the station wire 34, whereby position control of the vehicle 1 can be accurately implemented using the magnetic field from the station wire 34.

As stated above, the present embodiment is configured to have, in its second aspect, a guide for guiding an autonomously navigating utility vehicle (1) equipped with a prime mover (18) powered by a battery (20) to travel about a working area (AR) delineated by a boundary wire (2), to a charging station (3) for charging the battery (20), characterized in that: a pair of charging terminals (33) installed on the station (3) to be spaced apart each other via a first midpoint; a first wire (34) installed on the station (3) at a location inside or outside of the working area (AR) and being formed as a circular shape having a center (P0); a second wire (35) installed on the station (3) to project toward the location of the first wire (34), the second wire (35) being connected to the boundary wire (2) and being formed as a shape that is symmetrical with respect to a first center line (CL3) obtained by connecting the first midpoint of the pair of charging terminals (33) and the center (P0) of the first wire (34); a pair of charging terminals (22) installed on the vehicle (1) to be connected with the pair of charging terminals (33) installed on the station (3), the pair of charging terminals (22) installed on the vehicle (1) being spaced apart each other via a second midpoint; a first magnetic sensor (51C) installed on the vehicle (1) at a location on a second center line (CL1) extending from the second midpoint of the pair of charging terminals (22) installed on the vehicle (1) in a forward direction of the vehicle (1), the first magnetic sensor (51C) being adapted to produce an output indicating magnetic field generated by electric current supplied to the first wire (34); a pair of second magnetic sensors (51L, 51R) installed on the vehicle (1) to be spaced apart each other and symmetrically with respect to the second center line (CL1), the pair of second magnetic sensors (51L, 51R) being adapted to produce outputs indicating magnetic field generated by electric current supplied to the first wire (34) and the second wire (35); and a travel controlling unit (40B) that controls operation of the prime mover (18) to make the vehicle (1) move to bring the second center line (CL1) into coincidence with the first center line (CL3) based on the outputs of the first magnetic sensor (51C) and the pair of second magnetic sensors (51L, 51R).

With this, it becomes possible to enhance freedom of charging station 3 arrangement by enabling installation of the charging station 3 at an arbitrary position inside (or outside) the boundary wire 2 rather than on the boundary wire 2.

Specifically, the charging station 3 has the station wire 34 provided on the center line CL3 and the projecting wire 35 provided symmetrically with respect to the center line CL3, while, in association with the wires 34 and 35, the vehicle 1 has the magnetic sensor 51C provided on the center line CL1 and the magnetic sensors 51L and 51R provided symmetrically with respect to the center line CL1, so that by controlling travel activity of the utility vehicle 1 based on the detection values of the magnetic sensors 51L, 51R and 51C (FIG. 11), the center line CL1 of the utility vehicle 1 can be brought into coincidence with the center line CL3 of the charging station 3 during return mode without using trace-driving. Since the charging station 3 can therefore be provided in an arbitrary direction and at an arbitrary location other than on the boundary wire 2, freedom of charging station 3 arrangement is enhanced.

Moreover, although return to the charging station 3 by trace-driving tends to form ruts because the same travel route is followed, occurrence of ruts can be minimized by the present embodiment because trace-driving is not required. Since return travel distance to the charging station 3 is shorter than in the case of return by trace-driving, efficient return operation can be achieved.

In the guide, the travel controlling unit comprises: a first guiding unit (41) that controls operation of the prime mover (18) to guide the vehicle (1) to a position where the first magnetic sensor (51C) is placed on the center (P0) of the first wire (34); a second guiding unit (42) that controls operation of the prime mover (18) to guide the vehicle (1) to turn around the first magnetic sensor (51C) such that the second center line (CL1) is brought into coincidence with the first center line (CL3) when the vehicle (1) is guided to the position; and a third guiding unit (43) that controls operation of the prime mover (18) to guide the vehicle (1) toward the pair of charging terminals (33) installed on the station (3) when the second center line (CL1) is brought into coincidence with the first center line (CL3).

With this, in addition to the advantages and effects mentioned above, once the utility vehicle 1 is guided to near the charging station 3, the direction of the utility vehicle 1 is brought into coincidence with the direction of the charging station 3, and the utility vehicle 1 now in the target posture is thereafter driven forward toward the terminals 33, whereby the utility vehicle 1 can be easily and reliably guided to the charging station 3 to enable reliable connection of the terminals 22 and 33.

In the guide, the second wire (35) is formed as a shape of trapezoid that is symmetrical with respect to the first center line (CL3), and the pair of second magnetic sensors (51L, 51R) is installed on the vehicle (1) to be spaced apart each other by a first distance (d11) that is smaller than a second distance (d31) between two legs (351, 352) of the trapezoid in a direction perpendicular to the second center line (CL1).

With this, in addition to the advantages and effects mentioned above, in the condition of the center line CL1 of the utility vehicle 1 being coincident with the center line CL3 of the charging station 3, the pair of magnetic sensors 51L and 51R is positioned inside the projecting wire 35, i.e., in the area AR1 outside the working area AR, whereby the utility vehicle 1 can be accurately moved to the target posture using the detection values of the magnetic sensors 51L and 51R.

In the guide, the first wire (34) has a circular shape portion and line segments connected to the circular shape portion, the second wire (35) is formed as a shape of trapezoid having an inner area (AR1), and the circular shape portion of the first wire (34) is installed on the station (3) at a position outside of the inner area (AR1) of the second wire (35).

With this, in addition to the advantages and effects mentioned above, magnetic fields can be emitted from the projecting wire 35 and the station wire 34 at positions apart from each other, and after the utility vehicle 1 is positionally controlled, the utility vehicle 1 can be easily posture controlled.

Although the present embodiment is configured such that the vehicle 1 is driven by the prime mover comprising a pair of travel motors 18L, 18R, it may be configured such that the vehicle 1 can be driven by other prime mover such as an internal combustion engine.

It should be noted in the above that, although the present embodiment is applied for a lawn mower for lawn or grass mowing work, it may applied to any other type of utility vehicle.

While the present invention has been described with reference to the preferred embodiments thereof, it will be understood, by those skilled in the art, that various changes and modifications may be made thereto without departing from the scope of the appended claims.

What is claimed is:

1. A charging station for charging a battery installed on an autonomously navigating utility vehicle equipped with a prime mover powered by the battery to travel about a working area delineated by a boundary wire in order to perform work autonomously, comprising:
    a pair of charging terminals installed on the station to be spaced apart from each other via a first midpoint, the pair of charging terminals on the station being capable of connecting with a pair of charging terminals installed on the vehicle;
    a first wire installed on the station at a location inside or outside of the working area and being formed as a circular shape having a center; and
    a second wire installed on the station to project toward the location of the first wire, the second wire being connected to the boundary wire and being formed as a shape that is symmetrical with respect to a first center line obtained by connecting the first midpoint of the pair of charging terminals on the station and the center of the first wire.

2. The charging station according to claim 1, wherein the first wire has a circular shape portion and line segments connected to the circular shape portion.

3. The charging station according to claim 2, wherein the second wire is formed as a shape of a trapezoid having an inner area, and the circular shape portion of the first wire is installed on the station at a position outside of the inner area of the second wire.

4. The charging station according to claim 1, further including:
    an electric current supplier that supplies electric current to the first wire to generate a magnetic field of a first pattern around the first wire and supplies electric current to the second wire to generate a magnetic field of a second pattern around the second wire, the second pattern being different from the first pattern generated around the first wire.

5. The charging station according to claim 4, further comprising:
    a first magnetic sensor installed on the vehicle at a location on a second center line extending from a second midpoint of the pair of charging terminals installed on the vehicle in a forward direction of the vehicle, the first magnetic sensor being adapted to produce an output indicating the magnetic field generated by the electric current supplied to the first wire;
    a pair of second magnetic sensors installed on the vehicle to be spaced apart from each other and symmetrically with respect to the second center line, the pair of second magnetic sensors being adapted to produce outputs indicating the magnetic field generated by the electric current supplied to the first wire and the second wire; and
    a travel controlling unit that controls operation of the prime mover to make the vehicle move to bring the second center line into coincidence with the first center line based on the outputs of the first magnetic sensor and the pair of second magnetic sensors, such that the pair of charging terminals on the station connect with the pair of charging terminals on the vehicle.

6. The charging station according to claim 5, wherein the travel controlling unit comprises:
    a first guiding unit that controls operation of the prime mover to guide the vehicle to a position where the first magnetic sensor is placed on the center of the first wire;
    a second guiding unit that controls operation of the prime mover to guide the vehicle to turn around the first magnetic sensor such that the second center line is brought into coincidence with the first center line when the vehicle is guided to the position; and
    a third guiding unit that controls operation of the prime mover to guide the vehicle toward the pair of charging terminals on the station when the second center line is brought into coincidence with the first center line.

7. The charging station according to claim 5, wherein the second wire is formed as the shape of a trapezoid that is symmetrical with respect to the first center line, and the pair of second magnetic sensors is installed on the vehicle to be spaced apart from each other by a first distance that is smaller than a second distance between two legs of the trapezoid in a direction perpendicular to the second center line.

8. The charging station according to claim 5, wherein the first wire has a circular shape portion and line segments connected to the circular shape portion, the second wire is formed as the shape of a trapezoid having an inner area, and the circular shape portion of the first wire is installed on the station at a position outside of the inner area of the second wire.

9. A charging station for charging a battery installed on an autonomously navigating utility vehicle equipped with a prime mover powered by the battery to travel about a working area delineated by a boundary wire in order to perform work autonomously, the charging station comprising:
    a base having a longitudinal center line perpendicular to the boundary wire;
    a pair of charging terminals installed on the charging station to be spaced apart from each other via the center line, and configured to connect with a pair of charging terminals installed on the vehicle; and
    a first wire and a second wire installed in the base at vertically-offset levels so the first wire does not intersect with the second wire;
    the first wire is not connected to the boundary wire and has a circular shape, wherein a center point of first wire is aligned with the center line and is spaced from the boundary wire by a first distance;

the second wire is connected to the boundary wire and has a shape that is symmetrical with respect to the center line, the second wire comprising a first wire segment and a second wire segment extending substantially perpendicular from the boundary wire, and a third wire segment that connects the first wire segment to the second wire segment;

wherein the third wire segment is spaced from the boundary wire by a second distance that is less than the first distance.

10. A charging station for charging a battery installed on an autonomously navigating utility vehicle equipped with a prime mover powered by the battery to travel about a working area delineated by a boundary wire in order to perform work autonomously, the charging station comprising:

a base having a longitudinal center line;

a pair of charging terminals installed on the charging station to be spaced apart from each other via the center line;

a first wire and a second wire installed in the base at vertically-offset levels so the first wire does not intersect with the second wire; and an electric current supplier that supplies electric current to the first wire to generate a magnetic field of a first pattern around the first wire to guide the vehicle to a target position, and supplies electric current to the second wire to generate a magnetic field of a second pattern around the second wire to align the vehicle with the center line and guide the vehicle so that a pair of charging terminals installed on the vehicle connect with the charging terminals installed on the charging station.

* * * * *